United States Patent
Sevilla et al.

(10) Patent No.: US 10,706,029 B2
(45) Date of Patent: Jul. 7, 2020

(54) CONTENT NAME RESOLUTION FOR INFORMATION CENTRIC NETWORKING

(71) Applicant: CISCO TECHNOLOGY, INC., San Jose, CA (US)

(72) Inventors: Spencer Sevilla, Saratoga, CA (US); Priya Mahadevan, Sunnyvale, CA (US); Jose J. Garcia-Luna-Aceves, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 37 days.

(21) Appl. No.: 15/620,600

(22) Filed: Jun. 12, 2017

(65) Prior Publication Data

US 2017/0286461 A1    Oct. 5, 2017

Related U.S. Application Data

(63) Continuation of application No. 14/194,147, filed on Feb. 28, 2014, now Pat. No. 9,678,998.

(51) Int. Cl.
*G06F 16/22*     (2019.01)
*H04L 29/08*    (2006.01)

(52) U.S. Cl.
CPC .......... *G06F 16/22* (2019.01); *H04L 67/2842* (2013.01); *H04L 67/1004* (2013.01); *H04L 67/1095* (2013.01)

(58) Field of Classification Search
CPC .............. G06F 17/30312; G06F 16/22; H04L 67/2842; H04L 67/1004; H04L 67/1095
USPC ....................................................... 707/736
See application file for complete search history.

(56) References Cited

U.S. PATENT DOCUMENTS

| | | | |
|---|---|---|---|
| 817,441 | A | 4/1906 | Niesz |
| 4,309,569 | A | 1/1982 | Merkle |
| 4,921,898 | A | 5/1990 | Lenney |
| 5,070,134 | A | 12/1991 | Oyamada |

(Continued)

FOREIGN PATENT DOCUMENTS

| DE | 1720277 A1 | 6/1967 |
|---|---|---|
| DE | 19620817 A1 | 11/1997 |

(Continued)

OTHER PUBLICATIONS

Wetherall, David, "Active Network vision and reality: Lessons form a capsule-based system", ACM Symposium on Operating Systems Principles, Dec. 1, 1999, pp. 64-79.

(Continued)

*Primary Examiner* — Syed H Hasan
*Assistant Examiner* — Saba Ahmed

(57) ABSTRACT

A content-name-resolution (CNR) system can resolve IP addresses for named data objects (NDOs) based on their name. During operation, a CNR server can receive a query from a client device for a source to a named data object. The query can include at least a name prefix for the named data object. The CNR server can identify a cache server that corresponds to the named data object's name prefix, and determines one or more sources associated with the named data object's name prefix. The CNR server then returns, to the client device, a query response that includes a network address for the cache server, and includes a content record specifying the one or more sources.

17 Claims, 11 Drawing Sheets

(56) References Cited

U.S. PATENT DOCUMENTS

| | | |
|---|---|---|
| 5,110,856 A | 5/1992 | Oyamada |
| 5,506,844 A | 4/1996 | Rao |
| 5,629,370 A | 5/1997 | Freidzon |
| 5,870,605 A | 2/1999 | Bracho |
| 6,052,683 A | 4/2000 | Irwin |
| 6,091,724 A | 7/2000 | Chandra |
| 6,173,364 B1 | 1/2001 | Zenchelsky |
| 6,226,618 B1 | 5/2001 | Downs |
| 6,233,646 B1 | 5/2001 | Hahm |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,769,066 B1 | 7/2004 | Botros |
| 6,772,333 B1 | 8/2004 | Brendel |
| 6,862,280 B1 | 3/2005 | Bertagna |
| 6,901,452 B1 | 5/2005 | Bertagna |
| 6,917,985 B2 | 7/2005 | Madruga |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,061,877 B1 | 6/2006 | Gummalla |
| 7,206,860 B2 | 4/2007 | Murakami |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,382,787 B1 | 6/2008 | Barnes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,644,108 B1 * | 1/2010 | Malmskog .......... H04L 67/2842 709/203 |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,769,887 B1 | 8/2010 | Bhattacharyya |
| 7,779,467 B2 | 8/2010 | Choi |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,924,837 B1 | 4/2011 | Shabtay |
| 7,953,885 B1 | 5/2011 | Devireddy |
| 8,000,267 B2 | 8/2011 | Solis |
| 8,010,691 B2 | 8/2011 | Kollmansberger |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,312,064 B1 | 11/2012 | Gauvin |
| 8,386,622 B2 | 2/2013 | Jacobson |
| 8,467,297 B2 | 6/2013 | Liu |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,688,619 B1 | 4/2014 | Ezick |
| 8,699,350 B1 | 4/2014 | Kumar |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,862,774 B2 | 10/2014 | Vasseur |
| 8,903,756 B2 | 12/2014 | Zhao |
| 8,903,758 B2 | 12/2014 | Zhao |
| 8,937,865 B1 | 1/2015 | Kumar |
| 9,071,498 B2 | 6/2015 | Beser |
| 9,112,895 B1 | 8/2015 | Lin |
| 9,639,634 B1 * | 5/2017 | Greene .............. H04N 21/4668 |
| 2002/0010795 A1 | 1/2002 | Brown |
| 2002/0038296 A1 | 3/2002 | Margolus et al. |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0176404 A1 | 11/2002 | Girard |
| 2002/0188605 A1 | 12/2002 | Adya |
| 2002/0199014 A1 | 12/2002 | Yang |
| 2003/0046437 A1 | 3/2003 | Eytchison |
| 2003/0048793 A1 | 3/2003 | Pochon |
| 2003/0051100 A1 | 3/2003 | Patel |
| 2003/0074472 A1 | 4/2003 | Lucco |
| 2003/0097447 A1 | 5/2003 | Johnston |
| 2003/0099237 A1 | 5/2003 | Mitra et al. |
| 2003/0140257 A1 | 7/2003 | Paterka |
| 2004/0024879 A1 | 2/2004 | Dingman |
| 2004/0030602 A1 | 2/2004 | Rosenquist |
| 2004/0073715 A1 | 4/2004 | Folkes |
| 2004/0139230 A1 | 7/2004 | Kim |
| 2004/0221047 A1 | 11/2004 | Grover |
| 2004/0225627 A1 | 11/2004 | Botros |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |

(56) References Cited

U.S. PATENT DOCUMENTS

| | | |
|---|---|---|
| 2007/0127457 A1 | 6/2007 | Mirtorabi |
| 2007/0160062 A1 | 7/2007 | Morishita |
| 2007/0162394 A1 | 7/2007 | Zager |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander et al. |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0088370 A1 | 4/2010 | Wu |
| 2010/0094767 A1 | 4/2010 | Miltonberger |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0022812 A1 | 1/2011 | vanderLinden |
| 2011/0055392 A1 | 3/2011 | Shen |
| 2011/0055921 A1 | 3/2011 | Narayanaswamy |
| 2011/0060716 A1 | 3/2011 | Forman et al. |
| 2011/0060717 A1 | 3/2011 | Forman et al. |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0233182 A1* | 9/2012 | Baudel ............... G06F 9/451 |
| | | 707/748 |
| 2012/0257500 A1 | 10/2012 | Lynch |

(56) References Cited

U.S. PATENT DOCUMENTS

| | | |
|---|---|---|
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |
| 2012/0331112 A1 | 12/2012 | Chatani |
| 2013/0041982 A1 | 2/2013 | Shi |
| 2013/0051392 A1 | 2/2013 | Filsfils |
| 2013/0060962 A1 | 3/2013 | Wang |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |
| 2013/0124466 A1* | 5/2013 | Naidu .................. G06F 8/453 707/610 |
| 2013/0151584 A1 | 6/2013 | Westphal |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227166 A1 | 8/2013 | Ravindran |
| 2013/0242996 A1 | 9/2013 | Varvello |
| 2013/0250809 A1 | 9/2013 | Hui |
| 2013/0282854 A1 | 10/2013 | Jang |
| 2013/0282860 A1 | 10/2013 | Zhang |
| 2013/0282920 A1* | 10/2013 | Zhang .................. H04L 45/74 709/238 |
| 2013/0304937 A1 | 11/2013 | Lee |
| 2013/0329696 A1 | 12/2013 | Xu |
| 2013/0336323 A1 | 12/2013 | Srinivasan |
| 2013/0343408 A1 | 12/2013 | Cook |
| 2013/0346414 A1* | 12/2013 | Smith .................. G06F 16/48 707/741 |
| 2014/0003232 A1 | 1/2014 | Guichard |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0115037 A1* | 4/2014 | Liu .................. H04L 65/1016 709/203 |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0192717 A1 | 7/2014 | Liu |
| 2014/0195328 A1 | 7/2014 | Ferens |
| 2014/0195666 A1 | 7/2014 | Dumitriu |
| 2014/0233575 A1 | 8/2014 | Xie |
| 2014/0237085 A1 | 8/2014 | Park |
| 2014/0245359 A1 | 8/2014 | De Foy et al. |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0063802 A1 | 3/2015 | Bahadur |
| 2015/0095481 A1 | 4/2015 | Ohnishi |
| 2015/0095514 A1 | 4/2015 | Yu |
| 2015/0188770 A1 | 7/2015 | Naiksatam |
| 2016/0110466 A1* | 4/2016 | Uzun .................. H04L 63/1458 707/751 |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |

OTHER PUBLICATIONS

Kulkarni, A.B. et al., "Implementation of a prototype active network", IEEE, Open Architectures and Network Programming, Apr. 3, 1998, pp. 130-142.

Hoque et al., "NLSR: Named-data Link State Routing Protocol", Aug. 12, 2013, ICN'13.

Nadeem Javaid, "Analysis and design of quality link metrics for routing protocols in Wireless Networks", PhD Thesis Defense, Dec. 15, 2010, Universete Paris•Est.

Beben et al., "Content Aware Network based on Virtual Infrastructure", 2012 13th ACIS International Conference on Software Engineering.

Biradar et al., "Review of multicast routing mechanisms in mobile ad hoc networks", Aug. 16, Journal of Network$.

Detti et al., "Supporting the Web with an information centric network that routes by name", Aug. 2012, Computer Networks 56, pp. 3705-3702.

Garcia-Luna-Aceves et al., "Automatic Routing Using Multiple Prefix Labels", 2012, IEEE, Ad Hoc and Sensor Networking Symposium.

Hoque et al., 'NLSR: Named-data Link State Routing Protocol', Aug. 12, 2013, ICN 2013, pp. 15-20.

Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.

L. Wang et al., 'OSPFN: An OSPF Based Routing Protocol for Named Data Networking,' Technical Report NDN-0003, 2012.

Merindol et al., "An efficient algorithm to enable path diversity in link state routing networks", Jan. 10, Computer Networks 55 (2011), pp. 1132-1140.

Soh et al., "Efficient Prefix Updates for IP Router Using Lexicographic Ordering and Updateable Address Set", Jan. 2008, IEEE Transactions On Computers, vol. 57, No. 1.

V. Jacobson et al., 'Networking Named Content,' Proc. IEEE CoNEXT '09, Dec. 2009.

Jacobson, Van et al., "Content-Centric Networking, Whitepaper Describing Future Assurable Global Networks", Palo Alto Research Center, Inc., Jan. 30, 2007, pp. 1-9.

Koponen, Teemu et al., "A Data-Oriented (and Beyond) Network Architecture", SIGCOMM '07, Aug. 27-31, 2007, Kyoto, Japan, XP-002579021, p. 181-192.

(56) References Cited

OTHER PUBLICATIONS

Ao-Jan Su, David R. Choffnes, Aleksandar Kuzmanovic, and Fabian E. Bustamarie, Drafting Behind Akamai: Inferring Network Conditions Based on CDN Redirections. IEEE/ACM Transactions on Networking (Feb. 2009).
B. Lynn, The Pairing-Based Cryptography Library, http://crypto.stanford.edu/pbc/.
C. Gentry and A. Silverberg, Hierarchical ID-Based Cryptography, Advances in Cryptology—ASIACRYPT 2002. Springer Berlin Heidelberg (2002).
D. Boneh et al., "Collusion Resistant Broadcast Encryption With Short Ciphertexts and Private Keys", In proceedings of Crypto '05, LNCS 3621, pp. 258-275, 2005, Feb. 2005, 19 pages.
D. Boneh and M. Franklin. Identity-Based Encryption from the Well Pairing, Advances in Cryptology—CRYPTO 2001, vol. 2139, Springer Berlin Heidelberg (2001).
G. Ateniese, K. Fu, M. Green, and S. Hohenberger. Improved Proxy Reencryption Schemes with Applications to Secure Distributed Storage. In the 12th Annual Network and Distributed System Security Symposium (2005).
H. Xiong, X. Zhang, W. Zhu, and D. Yao. CloudSeal: End-to-End Content Protection in Cloud-based Storage and Delivery Services, Security and Privacy in Communication Networks. Springer Berlin Heidelberg (2012).
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Lotspiech, S. Nusser, and F. Pestoni. Anonymous Trust: Digital Rights Management using Broadcast Encryption. Proceedings of the IEEE 92.6 (2004).
J. Shao and Z. Cao. CCA-Secure Proxy Re-Encryption without Pairings. Public Key Cryptography. Springer Lecture Notes in Computer Sciencevol. 5443 (2009).
M. Blaze, G. Bleumer, and M. Strauss, 'Divertible protocols and atomic prosy cryptography,' in Proc. EUROCRYPT 1998, Espoo, Finland, May-Jun. 1998, pp. 127-144.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
RTMP (2009), Available online at http://wwwimages.adobe.com/www.adobe.com/content/dam/Adobe/en/devnet/rtmp/ pdf/rtmp specification 1.0.pdf.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Kamara and K. Lauter. Cryptographic Cloud Storage. Financial Cryptography and Data Security. Springer Berlin Heidelberg (2010).
Sandvine, Global Internet Phenomena Report—Spring 2012. Located online at http://www.sandvine.com/downloads/ documents/ Phenomenal H 2012/Sandvine Global Internet Phenomena Report 1H 2012.pdf.
The Despotify Project (2012). Available online at http://despotify.sourceforge.net/.
V. K. Adhikari, S. Jain, Y. Chen, and Z.-L. Zhang. Vivisecting Youtube:An Active Measurement Study. In INFOCOM12 Mini-conference (2012).
Vijay Kumar Adhikari, Yang Guo, Fang Hao, Matteo Varvello, Volker Hilt, Moritz Steiner, and Zhi-Li Zhang, Unreeling Netflix: Understanding and Improving Multi-CDN Movie Delivery. In the Proceedings of IEEE INFOCOM 2012 (2012).
Jacobson, Van et al, 'VoCCN: Voice Over Content-Centric Networks.' Dec. 1, 2009. ACM ReArch'09.
Rosenberg, J, "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposion on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Delti, Andrea, et al. "CONET: a content centric inter-networking architecture." Proceedings of the ACM SIGCOMM workshop on Information-centric network, ACM, 2011.
A. Wolman, M. Voelker, N. Sharma N, Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and counter-measures in Named Data Networking." IFIP Networking Conference, 2013. IEEE, 2013.
B. Ahlgren et al., 'A Survey of Information-centric Networking' IEEE Commun. Magazine, Jul. 2012, pp. 26-36.
Ban, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rusherford, and Alexander L. Wolf, 'A routing scheme for content-based networking,' INFOCOM 2004, Twenty-third Annual Joint Conference of the IEEE Computer and Communications, Societies, vol. 2, IEEE, 2004.
Cho, Jin-Hee, Ananthram Swami, and Ray Chen. "A survey on trust management for mobile ad hoc networks," Communications Surveys & Tutorials, IEEE 13.4 (2011): 562-583.
Compagno, Alberto, et al, "Poseidon: Mitigating interest flooding DDoS attacks in named data networking," Local Computer Networks (LCN), 2013 IEEE 38th Conference on, IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D.K. Smetters, P. Golle, and J.D. Thornton, "CCNx access control specifications," PARC, Tech. Rep., Jul. 2010.
Dabirmoghaddam, et al., "Understanding Optimal Caching and Opportunistic Caching at "The Edge" of Informtation-Centric Networks," ICN' 14, Sep. 2014, 10 pages.
Dijkstra, Edsger W., and Carel S. Scholten. 'Termination detection for diffusing computations,' Information Processing Letters 11.1 (1980): 1-4.

(56) References Cited

OTHER PUBLICATIONS

Dijkstra, Edsger W., Wim HJ Feijen, and A. J. M. Van Gasteren, "Derivation of a termination detection algorithm for distributed computations." Control Flow and Data Flow: concepts of distributed programming. Springer Berlin Heidelberg, 1956. 507-512.

E. Rescorla and N. Modadugu, "Datagram transport layer security," IETF RFC 4347, Apr. 2006.

E.W. Dijkstra, W. Feijen, and A.J.M. Van Gasteren, "Derivation of a Termination Detection Algorithm for Distributed Computations," Information Processing Letter, vol. 16, No. 5, 1983.

Fayazbakhsh, et al., "Less Pain, Most of the Gain: Incrementally Deployable ICN," SIGCOMM'13, Aug. 2013, 12 pages.

G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.

G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.

G. Xylomenos et al., "A Survey of Information-centric Networking Research," IEEE Communication Surveys and Tutorials, Jul. 2013.

Garcia, Humberto E., Wen-Chiao Lin, and Semyon M. Meerkov, "A resilient condition assessment monitoring system," Resilient Control Systems (ISRCS), 2012 5th International Symposium on, IEEE, 2012.

Garcia-Luna-Aceves, Jose J. 'A unified approach to loop-free routing using distance vectors or link states.' ACM SIGCOMM Computer Communication Review, vol. 19, No. 4, ACM, 1989.

Garcia-Luna-Aceves, Jose J. 'Name-Based Content Routing in Information Centric Networks Using Distance Information' Proc ACM ICN 2014, Sep. 2014.

Ghali, Cesar, GeneTsudik, and Ersin Uzun, "Needle in a Haystack: Mitigating Content Poisoning in Named-Data Networking," Proceedings of NDSS Workshop on Security of Emerging Networking Technologies (SENT). 2014.

Ghodsi, Ali, et al. "Information-centric networking: seeing the forest for the trees." Proceedings of the 10th ACM Workshop on Hot Topics in Networks. ACM, 2011.

Ghodsi, Ali, et al. "Naming in content-oriented architectures." Proceedings of the ACM SIGCOMM workshop on information-centric networking, ACM, 2011.

Gupta, Anjali, Barbara Liskov, and Rodrigo Rodrigues, "Efficient Routing for Peer-to-Peer Overlays." NSDI. vol. 4, 2004.

Heckerman, David, John S. Breese, and Koos Rommelse. "Decision-Theoretic Troubleshooting." Communications of the ACM. 1995.

Heinemeier, Kristin, et al. "Uncertainties in Achieving Energy Savings from HVAC Maintenance Measures in the Field." ASHRAE: Transactions 118.Part 2 (2012).

Herlich, et al., "Optimizing Energy Efficiency for Bulk Transfer Networks," http://www.cs.uni-paderborn.de/fileadmin/informationik/ag-karl/publications/miscellaneous/opmtimizing.pdf, Apr. 2010, 3 pages.

https://code.google.com/p/ccnx-trace/.

I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.

Intanagonwiwat, et al., "Directed Diffusion: A Scalable and Robust Communication Paradigm for Sensor Networks," MobiCom '00: Proceedings of the 6th Annual International Conference on Mobile Computing and Networking, Aug. 2000, 12 pages.

J. Aumasson and D. Bernstein, "SipHash: a fast short-input PRF", Sep. 18, 2012.

J. Hur, "Improving security and efficiency in attribute-based data sharing," IEEE , Trans. Knowledge Data Eng., vol. 25, No. 10, pp. 2271-2282, Oct. 2013.

Jacobson et al., "Custodian-Based Information Sharing," Jul. 2012, IEEE Communications Magazine: vol. 50 Issue 7 (p. 3843).

Ji, Kuri, et al. "Prognostics enabled resilient control for model-based building automation systems," Proceedings of the 12th Conference of International Building Performance Simulation Association, 2011.

K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.

Katipamula, Srinivas, and Michael R. Brambley, "Review article: methods for fault detection, diagnostics, and prognostics for building systemsa review, Part 1." HVAC&R Research 11.1 (2005): 3-25.

Katipamula, Srinivas, and Michael R. Brambley, "Review article: methods for fault detection, diagnostics, and prognostics for building systemsa review, Part II." HVAC&R Research 11.2 (2005): 169-187.

L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.

Li, Wenjia, Anupam, Joshi, and Tim Finin, "Coping with node misbehaviors in ad hoc: networks: A multi-dimensional trust management approach." Mobile Data Management (MDM), 2010 Eleventh International Conference on IEEE, 2010.

Lopez, Javier, et al. "Trust management systems for wireless sensor networks: Best practices." Computer Communications 33.9 (2010): 1086-1093.

M. Green and G. Ateniese, "Identity-based proxy re-encryption," in Proc. ACNS 2007, Zhuhai, China, Jun. 2007, pp. 288-306.

M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.

M. Naor and B. Pinkas "Efficient trace and revoke schemes," in Proc. FC 2000, Anguilla, British West Indies, Feb. 2000, pp. 1-20.

M. Nystrom, S. Parkinson, A. Rusch, and M. Scott, "PKCS#12: Personal information exchange syntax v. 1.1," IETF RFC 7292, K. Moriarty, Ed., Jul. 2014.

M. Parsa and J.J. Garcia-Luna-Aceves, "A Protocol for Scalable Loop-free Multicast Routing," IEEE JSAC, Apr. 1997.

M. Walfish, H. Balakrishnan, and S. Shenker, "Untangling the web from DNS," in Proc. USENIX NSDI 2004, Oct. 2010, pp. 735-737.

Mahadevan, Priya, et al. "Orbis: rescaling degree correlations to generate annotated internet topologies," ACM SIGCOMM Computer Communication Review, vol. 37, No. 4, ACM, 2007.

Mahadevan, Priya, et al. "Systematic topology analysis and generation using degree correlations." ACM SIGCOMM Computer Communication Review, vol. 36. No. 4. ACM, 2006.

Matocha, Jeff, and Tracy Camp, 'A taxonomy of distributed termination detection algorithms.' Journal of Systems and Software 43.3 (1998): 207-221.

Matteo Varvello et al., "Caesar: A Content Router for High Speed Forwarding", ICN 2012, Second Edition on Information-Centric Networking, New York, Aug. 2012.

McWilliams, Jennifer, A., and Iain S. Walker. "Home Energy Article: A Systems Approach to Retrofitting Residential HVAC Systems." Lawrence Berkeley National Laboratory (2005).

Mobility First Project [online], http://mobilityfirst.winlab.rutgers.edu/, Downloaded Mar. 9, 2015.

Narasimhan, Sriram, and Lee Brownston. "HyDE—A General Framework for Stochastic and Hybrid Modelbased Diagnosis." Proc. DX 7 (2007): 162-169.

NDN Project [online], http://www.named-data.net/, Downloaded Mar. 9, 2015.

Omar, Mawioud, Yacine Challal, and Abdelmadjid Bouabdallah. "Certification-based trust models in mobile ad hoc networks: A survey and taxonomy," Journal of Network and Computer Applications 35.1 (2012): 268-286.

Mahadevan, et al., "CCN-KRS: A Key Resolution Service for CCN," ICN'14, Sep. 2014, 10 pages.

S. Deering, "Multicast Routing in Internetworks and Extended LANs," Proc. ACM SIGCOMM '88, Aug. 1988.

S. Deering et al., "The PIM architecture for wide-area multicast routing," IEEE/ACM Trans, on Networking, vol. 4, No. 2, Apr. 1996.

(56) References Cited

OTHER PUBLICATIONS

S. Jahio, P. Mittal, and N. Borisov, "EASIER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Scalable and Adaptive Internet Solutions (SAIL) Project [online], http://sail-project.eu/ Downloaded Mar. 9, 2015.
Schein, et al., "A Simulation Study of a Hierarchical, Rule-Based Method for System-Level Fault Detection and Diagnostics in HVAC Systems," NISTIR 7216, US DEPARTMENT OF COMMERCE, National Institute of Standard and Technology, Building Environment Division Building and Fire Research Laboratory, Apr. 2005, 23 pages.
Shani, Guy, Joelle Pineau, and Robert Kaplow, "A survey of point-based POMDP solvers." Autonomous Agents and Multi-Agent Systems 27.1 (2013): 1-51.
Sheppard, John W., and Stephyn GW Butcher. "A formal analysis of fault diagnosis and d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves, 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B. G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.

V. Goyal, D. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
Verma, et al., "Probabilistic Models for Monitoring and Fault Diagnosis," Workshop Paper, The Second IARP and IEEE/RAS Joint Workshop on Technical Challenges for Dependable Robots in Human Environments, Oct. 2002, 10 pages.
Vutukury, Srinivas, and J. J. Garcia-Luna-Aceves. A simple approximation to minimum-delay routing, vol. 29, No. 4, ACM, 1999.
W. G. Tzeng, and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications". A dissertation submitted to the Swiss Federal Institute of Technology, Zurich, 2002.
Walker, Iain S. Best practices guide for residential HVAC Retrofits. No. LBNL-53532. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communication Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive-forwarding in named data networking.' ACM SIGCOMM computer communication review 42.3 (2012): 62-67.
Zahariadis, Theodore, et al, "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.'ACM SIGCOMM Computer Communication Review 44.3 (2014): 66-73.
D. Trossen and G. Parisis, "Designing and realizing and information-centric internet," IEEE Communications Magazing, vol. 50, No. 7, pp. 60-67, Jul. 2012.
Gasti, Paolo et al., 'DoS & DDoS in Named Data Networking', 2013 22nd International Conference on Computer Communications and Networks (ICCCN), Aug. 2013, pp. 1-7.
J. Hur and D.K. Noh, "Attribute-based access-control with efficient revocation in data outsourcing systers," IEEE Trans. Parallel Distrib. Syst, vol. 22, No. 7, pp. 1214-1221, Jul. 2011.
Kaya et al., "A Low Power Lockup Technique for Multi-Hashing Network Applications", 2006 IEEE Computer Society Annual Symposium on Emerging VLSI Technologies and Architectures, Mar. 2006.

* cited by examiner

CONTENT RECORD 350

| Content Name 352 ||  |
|---|---|---|
| Type 354 | Class 356 ||
| TTL 358 |||
| Object Security 360 |||
| Record Security 362 |||
| Protocol 364.1 | Protocol Attributes 366.1 | Address 368.1 |
| Protocol 364.2 | Protocol Attributes 366.2 | Address 368.2 |
| ⋮ |||
| Protocol 364.*n* | Protocol Attributes 366.*n* | Address 368.*n* |

FIG. 3B

CONTENT NAME RESOLUTION FOR INFORMATION CENTRIC NETWORKING

This is a continuation patent application of (and claims the benefit of priority under 35 U.S.C. § 120) of U.S. application Ser. No. 14/194,147, filed Feb. 28, 2014, entitled "CONTENT NAME RESOLUTION FOR INFORMATION CENTRIC NETWORKING," by inventors Spencer Sevilla, et al., issued on Jun. 13, 2017 as U.S. Pat. No. 9,678,998. The disclosure of the prior application is considered part of and is incorporated by reference in the disclosure of this application in its entirety.

BACKGROUND

Field

This disclosure is generally related to computer networks. More specifically, this disclosure is related to resolving a name for a piece of content to obtain network addresses to one or more servers that can provide the content.

Related Art

The Internet protocol suite includes a set of communication protocols designed to connect endpoints, such as the Transmission Control Protocol (TCP), and the Internet Protocol (IP). In this protocol suite, IP packets are switched and routed based on their source and destination addresses, which serves as the primary building-block for the entire suite of Internet protocols today. Building on IP, TCP provides reliable end-to-end transmission, and a domain name system (DNS) provides a directory that maps user-friendly hostnames to IP addresses. Also, the hypertext transfer protocol (HTTP) names individual directories and pieces of content within a host. When a client desires a particular piece of web content today, the client first uses DNS to map the hostname to an IP address, and then sends a HTTP request to this IP address to receive the content from the host.

However, using the Internet protocol suite and DNS servers to access web content creates a performance bottleneck at the HTTP servers, because these HTTP servers need to individually answer each HTTP request for the same piece of content. To make matters worse. Internet users are primarily concerned with having access to content, not necessarily to hosts. For example, a user that desires to stream a high-definition video feed would prefer to obtain the feed from a nearby server that can provide a faster bitrate than from the primary host for the media stream.

This disconnect has given rise to several peripheral technologies today, such as content delivery networks (CDNs) and HTTP proxies, which are designed to optimize or improve content distribution. CDNs have evolved as a service that a content publisher may employ to better and more efficiently distribute their content worldwide. CDNs employ DNS redirection, typically by appending a special set of characters (e.g., a388.g.akamaitech.net) to the original hostname in the URL. This process is constructed so that when a local DNS server attempts to resolve the hostname requested by the client, the local DNS server instead resolves the hostname of a relatively local server belonging to the CDN. This address is returned to the client, which then fetches the content from the local CDN server.

HTTP proxies approach the same problem from the client-side to traffic on the publisher's HTTP servers, which help reduce congestion throughout the Internet. An organization deploys an HTTP proxy at a network location that allows the proxy to see all outgoing HTTP requests, and their respective responses. The proxy caches the responses, and then directly answers subsequent requests for the same content without the request ever making its way to the publisher's HTTP servers.

However. HTTP proxies are oftentimes difficult to deploy, because they are not acknowledged by either DNS servers or CDNs. For a client to take advantage of a local proxy, the client browser needs to be configured to send HTTP requests directly to the HTTP proxy, or the HTTP proxy needs to be placed at a network location directly on the path between the client and the server.

Additionally, recent research efforts are producing information-centric networking (ICN) to re-architect the entire network stack around content. In ICN, packets typically do not contain network addresses for a source and a destination of the packet. Rather, clients issue requests for named data objects (NDOs), and routers across the network route these requests directly through the network to a closest network node that stores a copy of the content, which returns a packet that includes the requested NDO to respond to the request. However, ICNs represent a major departure from the current Internet architecture, and are fundamentally incompatible with today's TCP/IP stack. This incompatibility is a significant obstacle for any sort of deployment, and has hindered quick adoption of ICN proposals.

SUMMARY

One embodiment provides a content-name-resolution system that resolves IP addresses for named data objects (NDOs) based on their name. During operation, the system can receive a query from a client device for a source to a named data object. The query includes at least a name prefix for the named data object. The system then identifies a cache server that corresponds to the named data object's name prefix, and determines one or more sources associated with the named data object's name prefix. The system then returns, to the client device, a query response that includes a network address for the cache server, and includes a content record specifying the one or more source addresses, which can correspond to an origin server, a content delivery network (CDN) node, or any other device that hosts the named data object.

In some embodiments, the named data object can include any named object of an information centric network (ICN). In ICN, each piece of content is individually named, and each piece of data is bound to a unique name that distinguishes the data from any other piece of data, such as other versions of the same data or data from other sources. This unique name allows a network device to request the data by disseminating a request or an Interest that indicates the unique name, and can obtain the data independent from the data's storage location, network location, application, and means of transportation. Named-data network (NDN) or a content-centric network (CCN) are examples of ICN architecture; the following terms describe elements of an NDN or CCN architecture:

Content Object:

A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names:

A name in an ICN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ndn, and test.txt can be structured in a left-oriented prefix-major fashion to form the name "/parc/home/ndn/test.txt." Thus, the name "/parc/home/ndn" can be a "parent" or "prefix" of "/parc/home/ndn/test.txt." Additional components can be used to distinguish between different versions of the content item, such as a collaborative document.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814 (entitled "ORDERED-ELEMENT NAMING FOR NAME-BASED PACKET FORWARDING," by inventor Ignacio Solis, filed 20 Mar. 2013), which is hereby incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest:

A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

In some embodiments, the ICN system can include a content-centric networking (CCN) architecture. However, the methods disclosed herein are also applicable to other ICN architectures as well. A description of a CCN architecture is described in U.S. patent application Ser. No. 12/338,175 (entitled "CONTROLLING THE SPREAD OF INTERESTS AND CONTENT IN A CONTENT CENTRIC NETWORK," by inventors Van L. Jacobson and Diana K. Smetters, filed 18 Dec. 2008), which is hereby incorporated by reference.

In some embodiments, while identifying the cache server, the system determines whether a cache server has been assigned to the named data object's name prefix. If a cache server has not been assigned to the named data object's name prefix, the system selects a cache server for the name prefix, and binds the content object's name prefix to the selected cache server.

In some embodiments, the system can select the cache server by using a load-balancing function to select a cache server from a plurality of cache servers, and/or by using a hash function to compute, from the named data object's name prefix, a hash value that identifies a cache server.

In some embodiments, the system can receive, from a peer CNR server, a request for a content record associated with a second name prefix. The system can select, for the peer CNR server, one or more content servers associated with the name prefix. The system can generate the content record to satisfy the request by generating a base content record for the name prefix, and generating a second content record by updating the base content record to include the selected content servers. The system can then send the content record to the peer CNR server.

In some embodiments, the system can generate the content record by selecting one or more cache servers associated with the name prefix, generating a base content record for the name prefix, and updating the base content record to include the selected content servers.

In some embodiments, the content record can also include the name for the named data object, a security field, a content delivery protocol, and a set of protocol attributes.

In some embodiments, the content record specifies, for each network address, a corresponding content delivery protocol and a set of protocol attributes.

In some embodiments, the content record includes the sources in a sorted list. The list can be sorted according to one or more of a hop count between the CNR server and the sources, a physical distance between the CNR server and the sources, a network latency between the CNR server and the sources, an available network bandwidth to the sources, a processing delay at the sources, and an average load at the sources.

In some embodiments, the system can determine one or more authoritative sources by determining a remote content-name-resolution server associated with a portion of the name prefix. The system then sends, to the remote content-name-resolution server, a request for the content record associated with the name prefix.

In some embodiments, after receiving the content record from the remote content-name-resolution server, the system stores the content record in association with the name prefix.

One embodiment provides a cache server that can process a content record to obtain a named data object from a local cache or an origin server for the named data object. During operation, the cache server can receive a request from a client device for a named data object. The request can include a name for the named data object, and can include a content record specifying one or more sources associated with a name prefix for the named data object. The cache server determines whether a local cache stores the named data object. If the cache does not store the named data object, the cache server sends a request for the named data object to a source specified in the content record. Then, in response to receiving the named data object from the specified source, the cache server returns the named data object to the client device.

In some embodiments, after receiving the named data object from the specified source, the cache server stores the named data object in the local cache.

BRIEF DESCRIPTION OF THE FIGURES

FIG. 3B illustrates an exemplary content record that includes sources for multiple content-delivery protocols in accordance with an embodiment.

In the figures, like reference numerals refer to the same figure elements.

DETAILED DESCRIPTION

Figure 1:
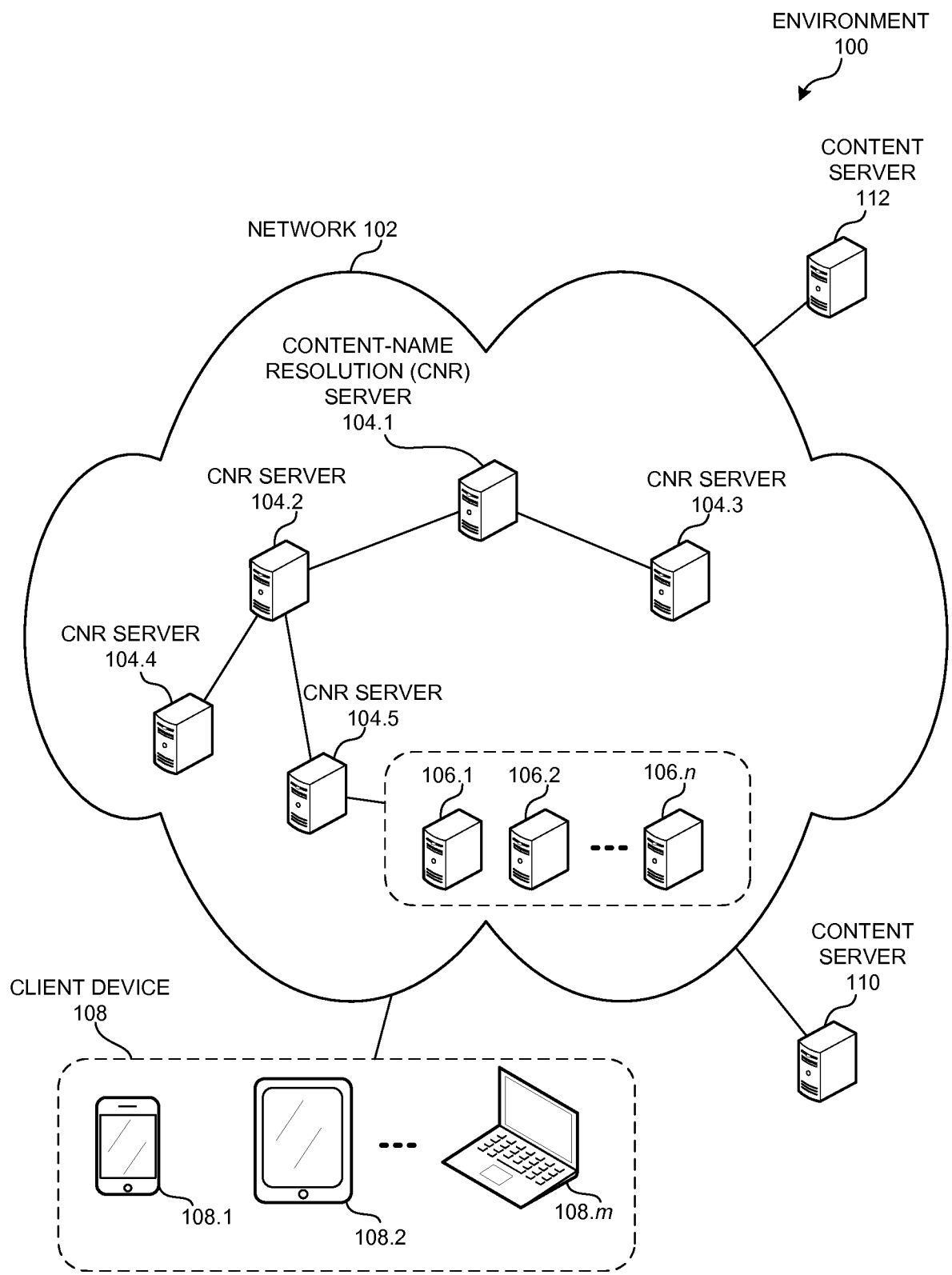
FIG. 1 illustrates an exemplary computing environment for retrieving a named data object based on a name prefix in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system of one or more content-name resolution (CNR) servers that solves the problem of resolving IP addresses for named data objects (NDOs) based on their name. A client device can send a request that includes a name for an NDO to a local CNR server, and the CNR server can perform content-name resolution by mapping the name prefix to a set of network addresses to content producers that can provide the NDO. The CNR server can respond to the client device's request by returning a packet that includes the set of network addresses for the content producers.

Hence, the CNR servers achieve the majority of benefits from information centric networking (ICN), and provide an ICN interface to end hosts, applications, and network clients by leveraging existing Internet and Web technologies. More importantly. CNR servers can reduce the cost of deploying ICN features over a computer network. For example, Internet service providers (ISPs) can adapt some domain name system (DNS) servers to implement CNR capabilities that perform content-name resolution. This allows ISPs to retain their existing routers and network switches, and allows network clients to continue accessing content over the Internet based on domain names. These adapted DNS servers can process requests that include a domain name using domain-name resolution, can process requests that include a name prefix for an NDO using content-name resolution. In the remainder of this disclosure, the term "CNR server" is used to refer to a server that performs content-name resolution, and is also used to refer to a modified DNS server that performs both domain-name resolution and content-name resolution.

The CNR system described herein performs content delivery using two separate request-response pairings. The first request is to a CNR server that maps the content's name to an address where the content can be found, and the second request (e.g., HTTP) is to obtain the content itself. This is different from information centric networks (ICN), such as content-centric networks (CCN) or named data networks (NDN) that typically perform content delivery through a single request-response pairing. In ICNs, a content request is routed to a node that can provide the content, and the node returns a response that includes the content.

The multiple request-response pairs of the CNR system separate the act of locating content from the act of serving the content, which produces one topology for content-location and another topology for content-distribution. Each of these two topologies can be optimized for particular traffic loads. Most importantly, these two topologies can evolve and be optimize independently from each other, and from the core routing infrastructure that routes IP packets between hosts.

In some embodiments, when a client application, such as a web browser, wishes to access a named data object (e.g., an NDO with a name "/parc/videos/spencer/v1.mpeg"), the web browser issues a CNR request for the content name to a local CNR server. CNR servers may extend the DNS to directly support content names via a Content Record (CR), which is a new type of DNS Resource Record that represents a specific piece of named content. As in the DNS today, the client's request is routed to the authoritative CNR zone for the name, which responds with the corresponding content record if one exists. Once the client application receives the content record, the application selects an address from the provided address set and uses the specified protocol to issue a content request for the named content to this address.

When a client resolves a content record through the DNS, the client receives the address of a server hosting the content along with the necessary information to verify the authenticity of the content. Note that when resolving a content record, the address provided does not need to be a network address of the origin server, as is the case with hostnames today. Rather, the address can point to a server from the publisher, or the address can point to a CDN node, an alternate mirror, or even a local hypertext transfer protocol (HTTP) cache.

The content record also specifies the protocol being used to serve the content, along with any protocol-specific information. Hence, the CNR server can support any content delivery protocol now known or later developed, such as HTTP, file transfer protocol (FTP), network file system (NFS). Of these content delivery protocols, HTTP is the most common and prevalent protocol in use today, and so HTTP is used hereinafter to describe capabilities of the CNR system. However, the CNR system and the content records are in no way bound to HTTP or any particular content delivery protocol.

FIG. 1 illustrates an exemplary computing environment 100 for retrieving a named data object based on a name prefix in accordance with an embodiment. Computing environment 100 can include a computer network 102, which can include any wired or wireless network that interfaces various computing devices to each other, such as a computer network implemented via one or more technologies (e.g., Bluetooth, Wi-Fi, cellular. Ethernet, fiber-optic, etc.). In some embodiments, network 102 can include the Internet.

Also, in some embodiments, network 102 can include a hierarchy of CNR servers that each can resolve a set of name prefixes, similar to a hierarchy of DNS servers. For example, if a client device 108 issues a query to CNR server 104.5 for a name prefix for which a content record does not exist locally, CNR server 104.5 can resolve the name prefix by forwarding to another CNR server associated with at least a portion of the name prefix. However, unlike DNS, the content-name resolution (CNR) process maps a name or name prefix to a named data object with the name, rather than to a host.

Naming content directly enables much finer-grained load-balancing through two separate mechanisms. First, the content records can assign different content names or name prefixes to separate servers. This allows different named data objects to easily be served by different content servers without requiring a central load-balancing server to balance loads on these content servers. Second, a particular piece of content can easily be accessed from multiple content servers as necessary, thereby balancing the load by adding a new IP address to the content record.

Additionally, resolving content names instead of host names enables content to migrate across various hosts and servers without having to specify a different URL or employing DNS redirection, since content-name resolution does not tie a content name and a host name. CNR servers 104 can dynamically generate or update content records when appropriate to account for how a piece of content can migrate over network 102. For example, CNR server 104.5 can include a content record for a given name prefix that specifies a content server 110 as an authoritative source for a piece of content. If the content becomes available at content server 112, CNR server 104.5 can update the content record to also specify content server 112 as another authoritative source for the piece of content.

Dynamic content-record generation can occur at any point along the CNR request-response path. In some embodiments, a local CNR server can include a content record that indicates a set of nearby hosts to a named data object, such that various CNR servers can include content records that specify different network addresses to the same data object. Client device 108 may receive a content record that specifies an address to content server 110, and a different client device local to CNR server 104.3 can receive a content record that specifies an address to content record 112.

Table 1 presents pseudocode performed by an authoritative CNR server in accordance with an embodiment of the present invention. This pseudocode generates a content record similar to how a DNS server generates a host record. However, unlike a typical DNS server, line 6 of Table 1 shows how a CNR server can generate the content record to also include an address set that is localized to the requesting node.

TABLE 1

```
receive_content_record_request(request) {
    if (does_not_exist(request)) {
        return error;
    }
    response = generate_base_response(request);
    add_localized_address_set(response);
    send_response(response);
}
```

In some embodiments, CNR servers can also assign cache servers to a name prefix. For example, client device 108 can send a query to local CNR server 104.5 for a named data object. If CNR server 104.5 is aware of a nearby cache containing the content, and if the local CNR server 104.5 has cached the base content record, CNR server 104.5 can dynamically generate a full content record with the address of the caching server. Moreover, CNR server 104.5 can do so without even querying an authoritative CNR 104.1. Table 2 includes exemplary pseudocode for a CNR server that can associate one or more cache servers to a name prefix for a named data object. Specifically, unlike a typical DNS server, line 4 of Table 2 shows how a CNR server can generate the content record to also include an address set for one or more cache servers assigned to a given name prefix.

TABLE 2

```
receive_content_record_request(request) {
    if (content_in_cache(request)) {
        response = generate_base_response(request);
        add_cache_address_set(response);
        send_response(response);
    } else {
        forward_through_cnr(request);
    }
}
```

The pseudocode in Table 1 and Table 2 is a departure from standard DNS policy, and effectively means that two clients residing in different locations may query the DNS for the same content name or name prefix and receive two different responses. This CNR implementation enables content localization and redirection (to CDNs, proxies, mirror sites, etc.), without fragmenting the content namespace or requiring caches to be directly on the path between the client (e.g., client device 108) and the origin server (e.g., content server 110 or 112).

In some embodiments, the CNR system can be deployed by modifying application-layer protocols and leaving the rest of the Internet protocol stack unchanged. This allows the CNR system to be deployed over existing computer networks. For example, CNR servers 104 can include domain name servers that can also perform content name resolution. However, unlike typical domain name servers that map domain names to network addresses, a CNR server 104 maps names for individual content objects to one or more network devices that can provide the content object.

Also, a web browser on a client device 108 can be changed to support content record resolution. The web browser may specify which types of records should be returned by a CNR query, and can issue the CNR query using a new protocol prefix, such as "cnr//." A universal resource locator (URL) starting with the prefix "cnr://" can include a CNR query for a content record representing the entire name (e.g., the full name following the "cnr.//" prefix). On the other hand, a CNR server 104 can resolve a URL starting with the prefix "http://" by performing a typical DNS lookup for the hostname portion of the name (e.g., not including a path portion of the name).

Additionally, the CNR system is compatible with the existing suite of web protocols, so deployment can be incremental and on a per-domain basis. A domain (such as parc.com) can choose to support content-name resolution simply by adding CNR content records for their existing content. Typical DNS servers that do not perform content-name resolution can still provide support for these CNR queries and responses, given that DNS servers must still forward queries and responses even if they do not recognize the type of resource record.

The content servers themselves, including the origin servers and CDN caches, do not need to be changed to support the CNR system. When a client successfully resolves a content record, the client receives all the information necessary to fetch the content, and can send a standard content request to a server over an existing computer network.

Figure 2:
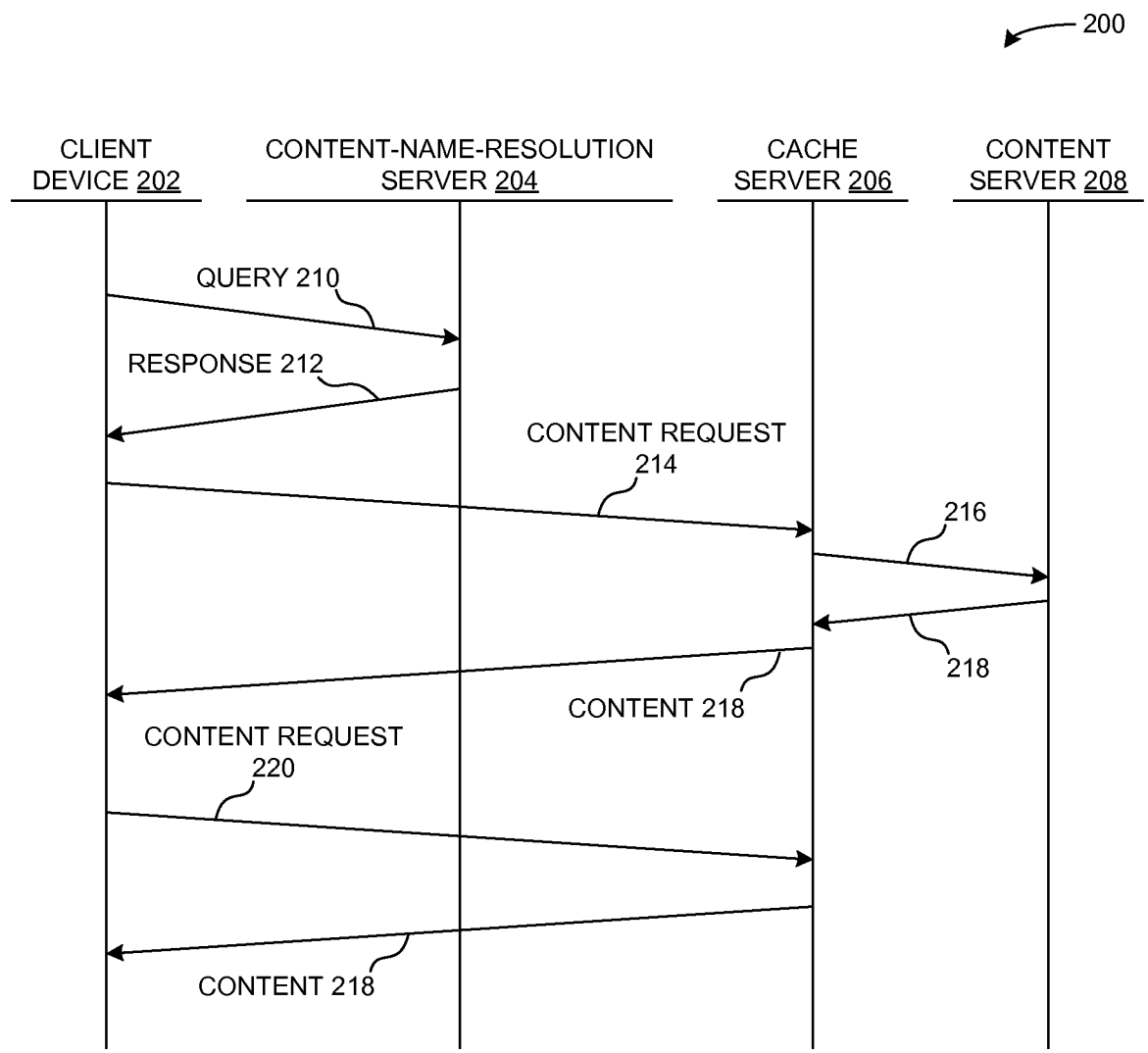
FIG. 2 illustrates exemplary communication with a content-name resolution server in accordance with an embodiment.

FIG. 2 illustrates exemplary communication with a content-name resolution server in accordance with an embodiment. During operation, an application running on a client device 202 receives a name prefix for a named data object to download. Client device 202 can perform a lookup operation in a local cache to determine whether the named data object has been cached. If client device 202 has not cached the data object, client device 202 can determine a remote server that stores the named data object by querying a content-name resolution server 204. In some embodiments, CNR server 204 can include a domain name server. For example, an internet service provider may assign a content-name resolution (CNR) server 204 to client device 202. Client device 202 can send a query 210 that indicates a name prefix for the content object to CNR server 204.

CNR server 204 obtains a content record for the name prefix, and determines a cache server 206 that client device 202 can use to obtain the named data object. CNR server 204 then sends a query response 212 to client device 202, such that query response 212 includes the content record and a network address for cache server 206. Client device 202 then obtains the network address for cache server 206 from the query response, and sends a request 214 for the named data object to cache server 206. This request can include the content record, which cache server 206 can use to determine a source for the named data object without having to query a content-name resolution server.

Cache server 206 can use the name prefix to perform a lookup operation in the local cache to determine whether cache server 206 stores the named data object. If cache server 206 does not store the data object, cache server 206 can use the content record to obtain a network address for a content server 208 that can provide the named data object, and sends a request 216 to content server 208 for the named data object. After receiving the named data object 218, cache server can cache the named data object, and sends named data object 218 to client device 202. If client device 202 or another client device sends a request 220 for named data object 218 at a later time, cache server 206 can return the cached copy of the named data object 218 to the client device.

In some embodiments, when client device 202 successfully resolves a CNR query for a named data object, client device 202 receives the base content record and one or more address records. In the event that client device 202 receives several address records, client device 202 may assume that the records have been ranked by locality, availability, or some other such metric. Thus, client device 202 should request the named data object from the first address first, and then proceed through the set of address records if and when they become necessary. Policies may arise and be standardized for address record ranking and ordering, similar to the rules for host IP address selection.

A strength of the CNR content record is that the record is extensible enough to support a wide range of content-delivery protocols. This eases the deployment of CNR servers, as well as ensures CNR servers are extensible in the future, such as to support future network-layer ICN proposals.

Figure 3A:
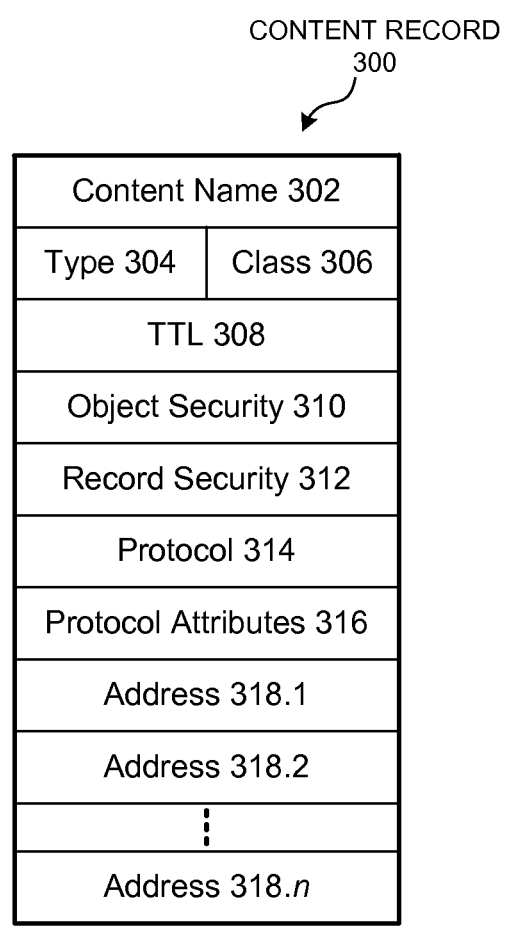
FIG. 3A illustrates an exemplary content record in accordance with an embodiment.

FIG. 3A illustrates an exemplary content record 300 in accordance with an embodiment. Content record 300 refers to a particular piece of named content, specified by its name and place in the DNS tree. Similar to a DNS record, content record 300 can include a content name 302 for a named data object, a type 304 of the content record, a class code 306 for the content record, and a time to live (TTL) field 308 that indicates a count that the content record remains valid. Note that one main distinction between content record 300 and a DNS record is that content name 302 for content record 300 corresponds to a piece of content independent of where this content is hosted.

Content record 300 also includes a set of IP addresses 318 to one or more network computers where the named data object can be found. The addresses are included in the response as individual DNS A{AAAA} records. A content record without any addresses is referred to as a base content record, whereas a full content record refers to a base content record with at least one address record. In some embodiments, the content record includes the sources in a sorted list. The list of sources can be sorted, for example, based on a hop count between the CNR server and the sources, a physical distance between the CNR server and the sources, a network latency between the CNR server and the sources, an available network bandwidth to the sources, a processing delay at the sources, an average load at the sources, and/or based on any other performance metrics now known or later developed.

Further, content record 300 can also include an object security field 310, a record security field 312. Object security field 310 contains the information necessary for a client to verify the provenance and authenticity of the content object. Object security field 310 can include, for example a hash value calculated from the content (e.g., md5: d131dd05 . . . ), or can include a public-key from the publisher used by the client to verify a signature provided with the content object. Hence, a client can use the object security field to protect against attacks and ensure data provenance and authenticity regardless of the source of the content, given that a piece of content can come from a large number of different sources, some of which may be unknown to the content publisher.

Object security field 310 allows content record 300 to secure the content object. However, for this to work, content record 300 must be secured as well. This is accomplished through record security field 312. Since content record 300 is a type of DNS record, object security field 310 can secure content record 300 through any one of several existing security protocols today, such as Domain Name System Security Extensions (DNSSEC).

In some embodiments, content record 300 can also include a protocol field 314 that specifies a content delivery protocol to use to obtain the named data object, and includes a protocol attributes field 316 that specifies protocol-specific values necessary for successful content delivery. HTTP is the most common content-delivery protocol in use today. To support HTTP, a content record can specify a hostname length number (HLN) as a protocol attribute, which is used to translate the content name from DNS to HTTP. This is important because names in DNS consist of one hierarchical component, whereas HTTP has two main components: the hostname and the path. Thus, the HLN is needed to denote the number of components in the hostname, with the assumption that the remainder of the name is the content path. Once a client translates a name from DNS to HTTP using the HLN, the client can issue an HTTP request to one of the servers in the address set included in the content record.

FTP is another popular content-delivery protocol, and is considered superior for transferring larger files. The content record can support FTP by specifying the filename used for the FTP transfer.

In some embodiments, the set of content servers that host a named data object may allow a client device to download the data object through one of various possible content-delivery protocols. To accommodate these various protocols, a content record can specify a content delivery protocol and protocol attributes for each address to a source.

FIG. 3B illustrates an exemplary content record 350 that includes sources for multiple content-delivery protocols in accordance with an embodiment. Content record 350 can include a set of content delivery protocols 364, a set of protocol attributes 366, and a set of addresses for various content servers. Specifically, content record 350 specifies that a content server at an address 368.1 can support a content delivery protocol 364.1, and specifies protocol-specific values 366.1 necessary for successful content delivery via protocol 364.1.

Requesting Content

In the CNR system, the process of requesting a piece of content starts with a DNS name, though translation may be performed if the user or application provides a name in a valid format, such as via an HTTP URL. The DNS name is used in a content request, which is routed through the CNR system as usual, and a content record (containing a HLN) is returned to the client. The client then uses the DNS name in combination with the HLN to construct an HTTP name, and uses this name to request the piece of content using HTTP.

In some embodiments, a computer can translate an HTTP URL to a DNS content name by partitioning the name at the first slash, which indicates the end of the hostname and the beginning of the path. The computer then translates the path to DNS by first swapping the order of all names broken by the "/" character. For example, the computer can swap the order of the name components in "http://parc.com/videos/spencer/v1.mpeg" to create the string "v1.mpeg/spencer/videos." Next, the computer replaces each "l" character for a period ("."), and replaces each period (".") with a "/" character. Continuing the example above, the computer creates the string "v1/mpeg.spencer.videos." The computer then appends the hostname to this string to create the valid full DNS name: "v1/mpeg.spencer.videos.parc.com."

Translating from a URL form HTTP to DNS is a many-to-one translation, since the two URLs "http://parc.com/videos/spencer/v1.mpeg" and "http.//videos.parc.com/spencer/v1.mpeg" both translate to the same DNS content name "v1/mpeg.spencer.videos.parc.com." This is fine for HTTP-to-DNS translation, but means that a computer would need more information to perform a DNS-to-HTTP. In some embodiments, a computer can use the HLN in the content to perform a DNS-to-HTTP translation. The HLN record includes an integer that denotes the length of the hostname component of the URL when translating a name from DNS to HTP.

To translate from DNS to HTTP, the computer first removes the hostname (as indicated by the HLN) from the DNS name. The remaining string is the HTTP path, which the computer can translate by performing the process described above for translating the path in reverse order. Continuing the example from above, when HLN=3, the DNS name "v1/mpeg.spencer.videos.parc.com" translates to "http://videos.parc.com/spencer/v1.mpeg." Also, when HLN=2, the DNS name translates to "http://parc.com/videos/spencer/v1.mpeg."

In some embodiments, CNR supports using other types of names that can be translated to a DNS-formatted name. Many different, potentially more user-friendly naming schemes can be designed and supported as long as they can be mapped to a DNS name. For example, a content centric network (CCN) naming scheme can be used for a named data object's name. The CCN name is hierarchical in nature and includes a set of name components ordered from most general to most specific. A fully-qualified CCN name starting at the root could resemble "ccn://com/parc/videos/spencer/v1.mpeg." By designing a similar set of rules for name-translation as the ones above, a computer can translate this CCN name to the DNS name "v1/mpeg.spencer.videos.parc.com," and then proceeds to resolve the content through CNR. This illustrates how CNR can be used to support different naming schemes and formats that can map to a hierarchical DNS string.

Content Name Resolution Servers

Figure 4:
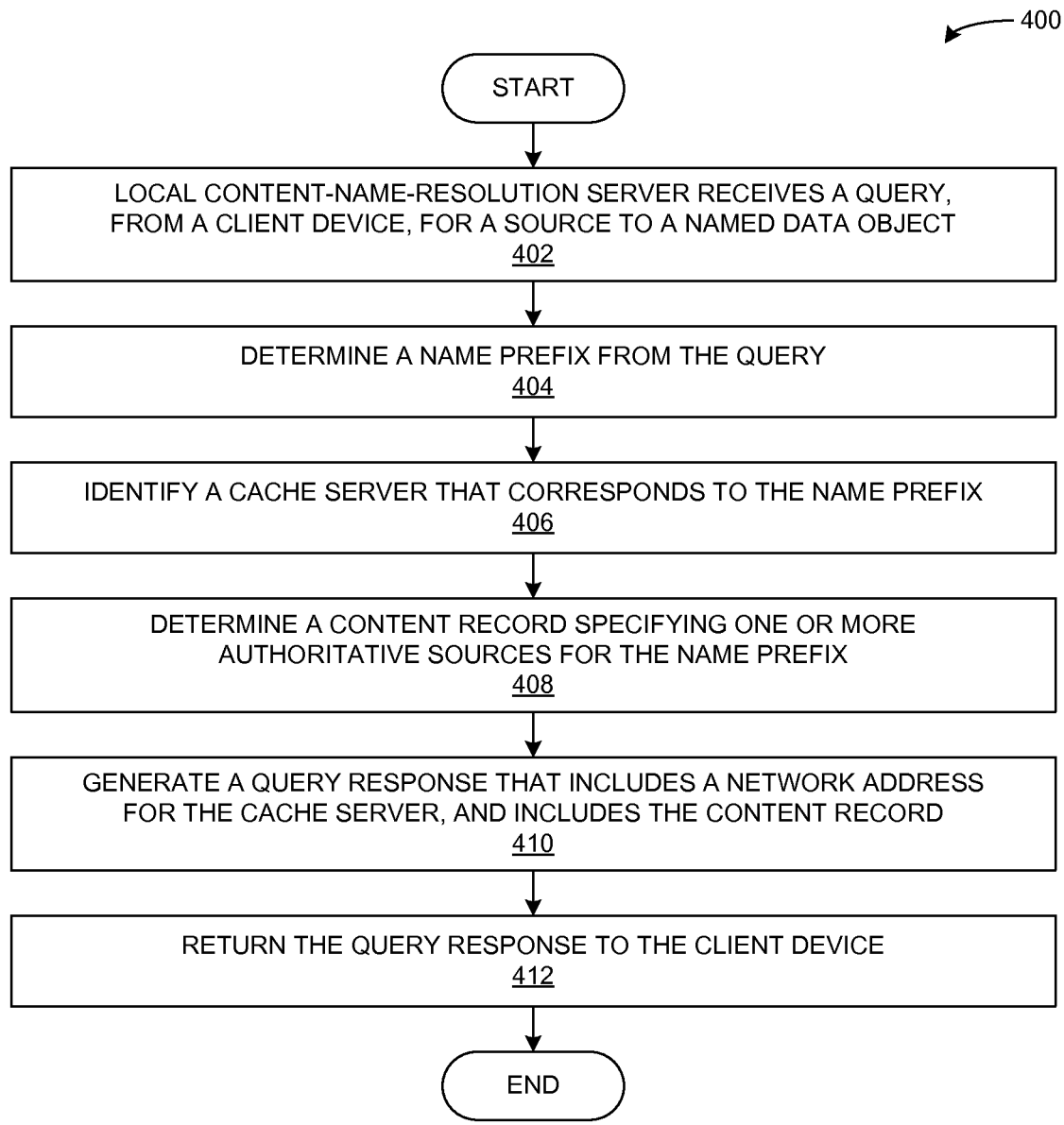
FIG. 4 presents a flow chart illustrating a method for processing a query for a source to a named data object in accordance with an embodiment.

FIG. 4 presents a flow chart illustrating a method 400 for processing a query for a source to a named data object in accordance with an embodiment. During operation, a local CNR server can receive a query, from a client device, for a source to a named data object (operation 402). The local CNR server can determine a name prefix from the query (operation 404), and uses the name prefix to identify a cache server that has been assigned to the name prefix (operation 406), and to determine a content record specifying one or more authoritative sources for the name prefix (operation 408). The local CNR server then generates a query response that includes a network address for the cache server, and that includes the content record (operation 410), and returns the query response to the client device (operation 412).

Figure 5:
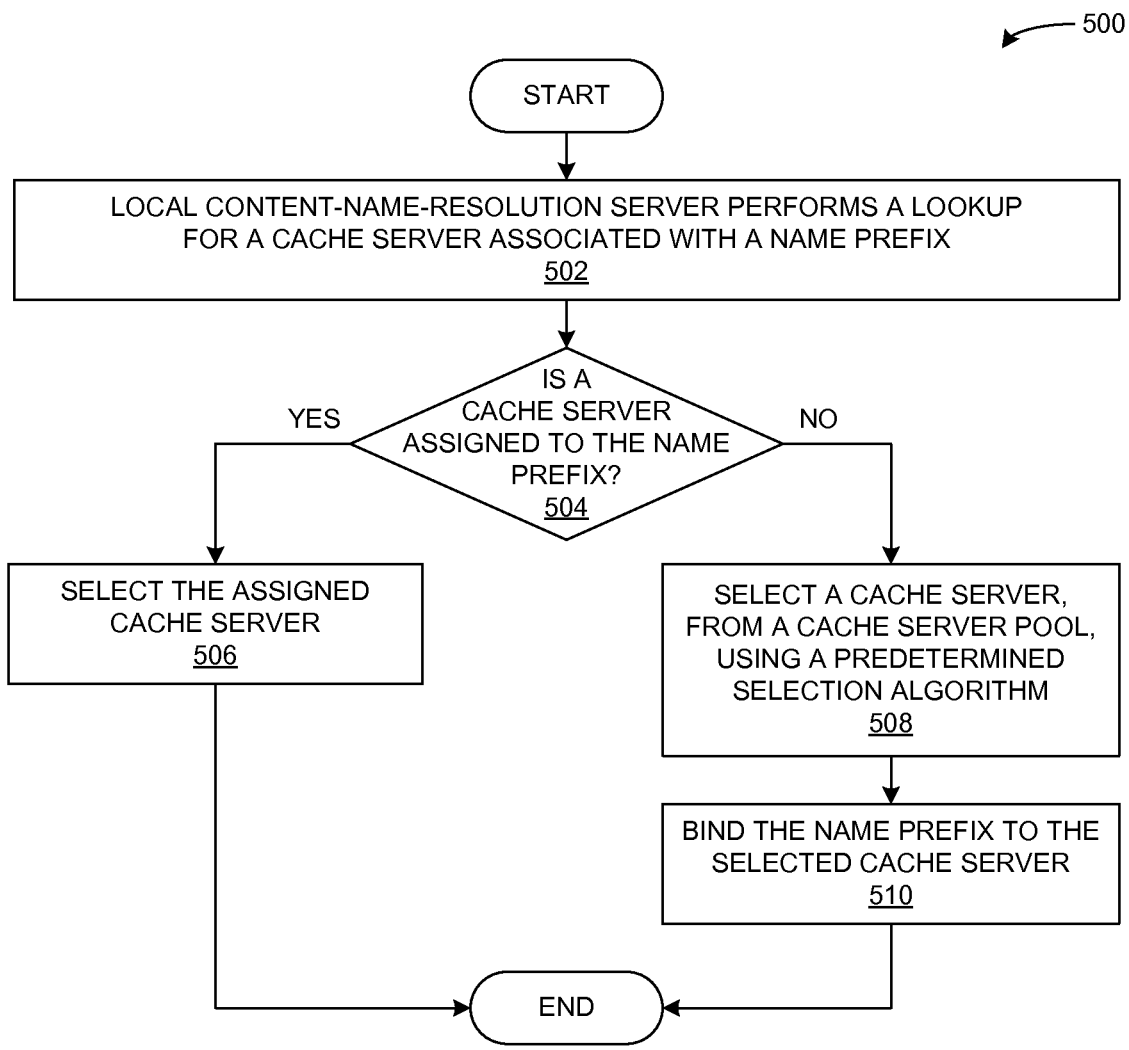
FIG. 5 presents a flow chart illustrating a method for selecting a cache server that is assigned to a name prefix in accordance with an embodiment.

FIG. 5 presents a flow chart illustrating a method 500 for selecting a cache server that is assigned to a name prefix in accordance with an embodiment. During operation, the local CNR server performs a lookup for a cache server associated with the name prefix (operation 502), and determines whether a cache server has been assigned to the name prefix (operation 504). If so, the local CNR server selects the assigned cache server to return to the client device (operation 506).

However, if a cache server has not been assigned to the name prefix, the local CNR server selects a cache server to assign to the name prefix (operation 508). For example, the local CNR server can select a cache server from a cache server pool using a predetermined selection algorithm. The selection algorithm can include a load-balancing function, a hashing function, or any other selection algorithm now known or later developed. The local CNR server binds the name prefix to the selected cache server (operation 510). The local CNR server can return this cache server to a client device that requests a named data object associated with the name prefix.

Figure 6A:
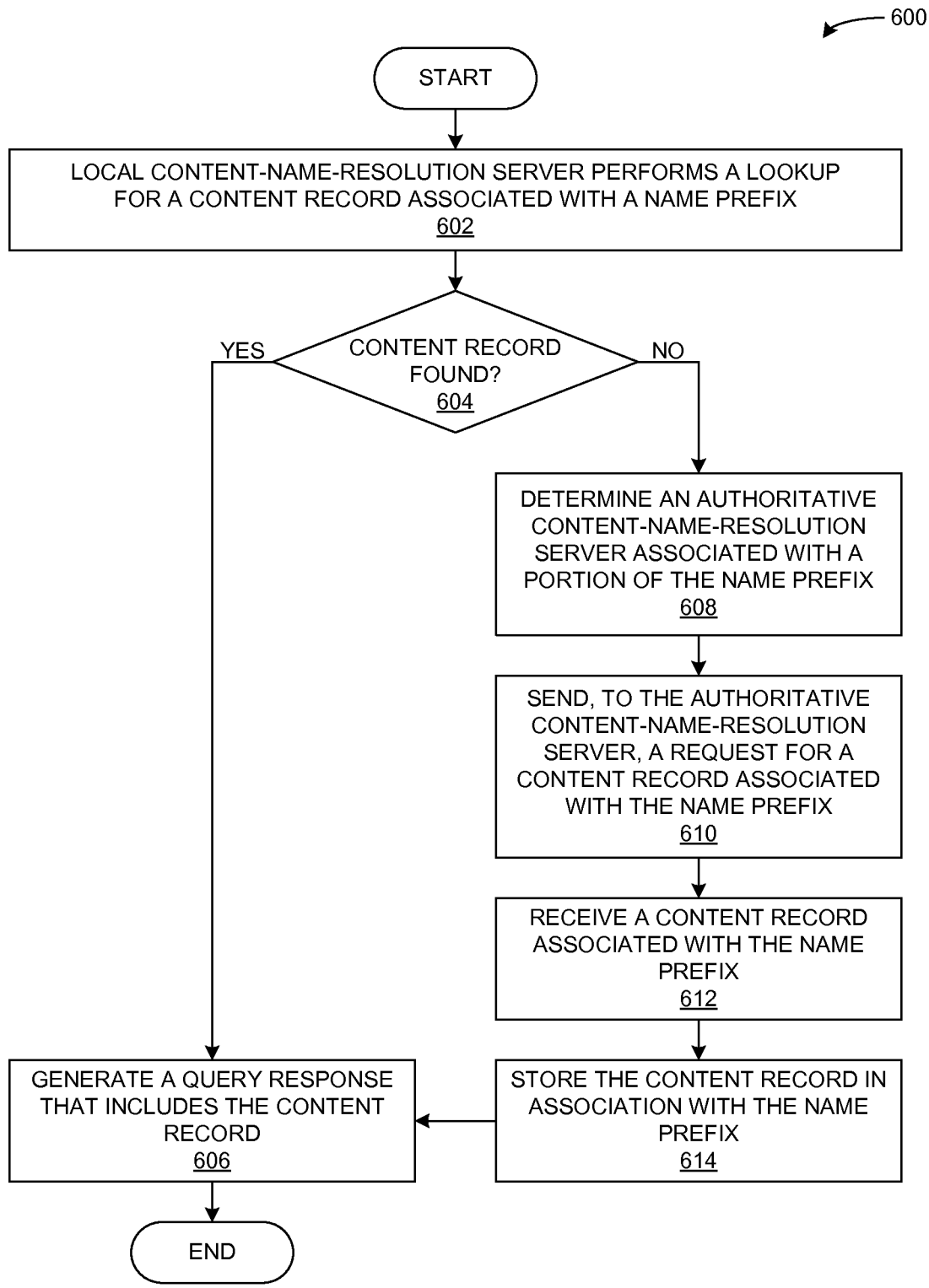
FIG. 6A presents a flow chart illustrating a method for obtaining a content record for a name prefix in accordance with an embodiment.

FIG. 6A presents a flow chart illustrating a method 600 for obtaining a content record for a name prefix in accordance with an embodiment. During operation, the local CNR server can perform a lookup operation for a content record associated with a name prefix (operation 602), and determines whether a content record exists (operation 604). If so, the local CNR server can generate a query response that includes the content record (operation 606).

However, if the local CNR server does not store a content record for the name prefix, the local CNR server can obtain the content record from an authoritative CNR server. For example, the local CNR server can identify an authoritative CNR server associated with at least a portion of the name prefix (operation 608), and sends a request for a content record associated with the name prefix to the authoritative CNR server (operation 610). Once the local CNR server receives a content record for the name prefix (operation 612), the local CNR server can store the content record in association with the name prefix (operation 614), and proceeds to operation 606 to generate a query response that includes the content record.

Figure 6B:
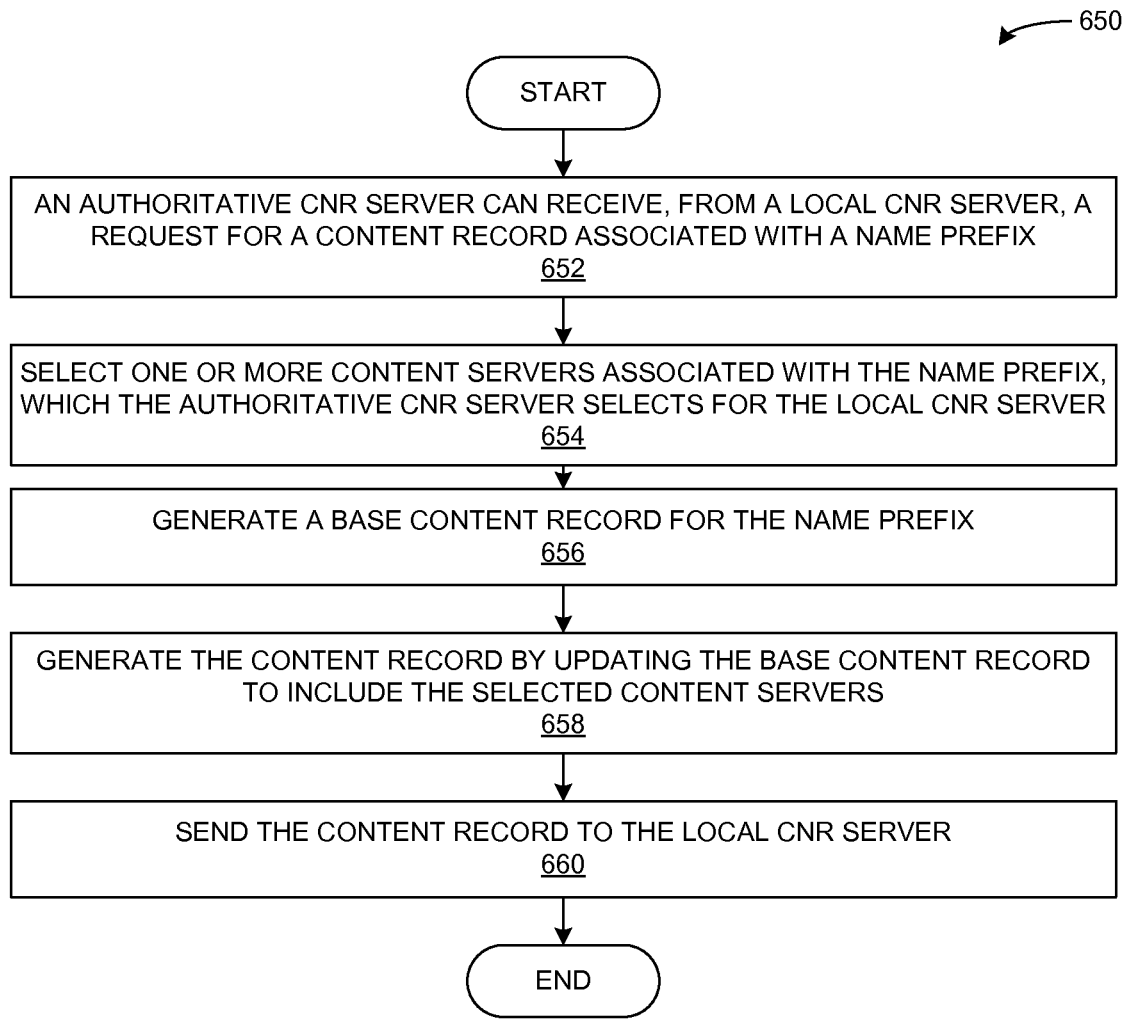
FIG. 6B presents a flow chart illustrating a method 650 for dynamically generating a content record for a name prefix in accordance with an embodiment.

FIG. 6B presents a flow chart illustrating a method 650 for dynamically generating a content record for a name prefix in accordance with an embodiment. During operation, the authoritative CNR server can receive, from a local CNR server, a request for a content record associated with a name prefix (operation 652). The authoritative CNR server then selects one or more content servers associated with the name prefix, which the authoritative CNR server selects for the local CNR server (operation 654).

In some embodiments, the authoritative CNR server can select the content servers by computing one or more performance metrics for the content servers, and selecting the content servers whose performance metric values are above a predetermined threshold. These performance metrics can include, for example, a distance-related metric between the local CNR server and the content server, such as a hop count between the CNR server and the sources, a physical distance between the CNR server and the sources, and a network latency between the CNR server and the sources. The performance metrics can also include other metrics related to the content server, such as an available network bandwidth for the sources, a processing delay at the sources, an average load at the sources, and/or any other metrics now known or later developed.

The authoritative CNR server then generates a base content record for the name prefix (operation 656), and generates the content record by updating the base content record to include the selected content servers (operation 658). In some embodiments, the authoritative CNR server can insert the set of content servers into the content record using a sorted list, such that the list is sorted based on one or more performance metrics. The authoritative server then sends the content record to the local CNR server (operation 670).

Cache Server

Figure 7:
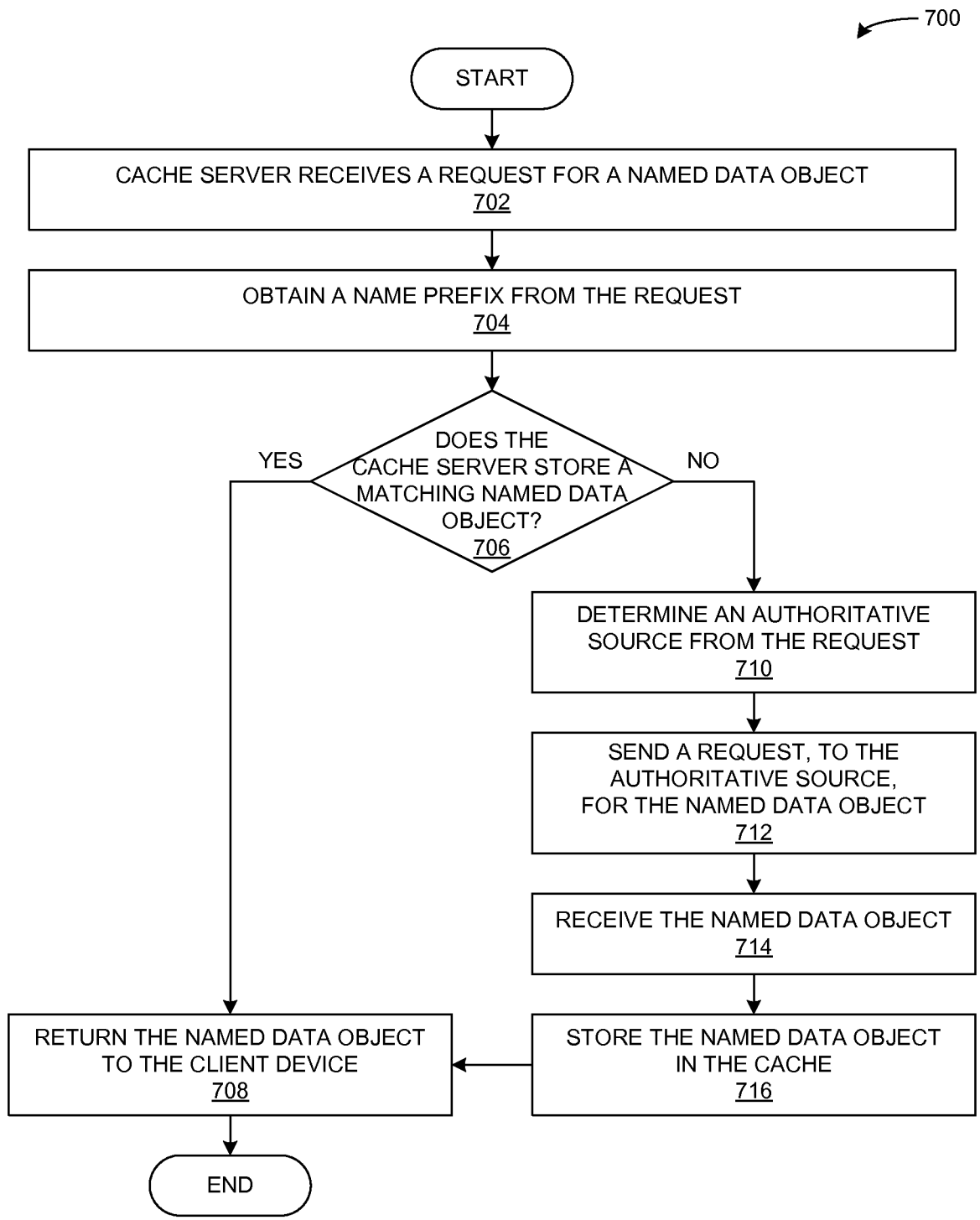
FIG. 7 presents a flow chart illustrating a method for processing a query at a cache server in accordance with an embodiment.

FIG. 7 presents a flow chart illustrating a method 700 for processing a query at a cache server in accordance with an embodiment. During operation, the cache server can receive a request for a named data object from a client device (operation 702), and obtains a name prefix from the request (operation 704). The cache server then determines whether the cache server stores a named data object whose name matches the name prefix (operation 706). If so, the cache server can return the matching named data object to the client device (operation 708).

However, if the cache server does not store a matching named data object, the cache server can determine a network address to an authoritative source from the request (operation 710), and sends a request for the named data object to the authoritative source (operation 712). Recall that the client device can include a content record from a CNR server in the request. In some embodiments, the cache server obtains the content record from the request, and analyzes the content record to obtain one or more network address to the authoritative sources. Once the cache server receives the requested named data object (operation 714), the cache server stores the named data object in the cache (operation 716), and proceeds to operation 708 to return the named data object to the client device.

CNR-Based Content Replication

A significant problem with HTTP and DNS is that neither protocol provides native mechanisms for replicating content across multiple servers, either through mirrors, caches, or CDNs. This forces application developers to develop systems to perform content replication and load balancing for Web services, on top of the HTTP and DNS framework. The CNR system of the present invention provides native support for efficient content replication and distribution, which can serve as groundwork for implementing an information centric network.

The CNR system separates the content replication and distribution topology from the name resolution topology (e.g., DNS). The content replication and distribution topology can include CDNs, mirrors, and HTTP caches. Mirrors can include long-lived content replicas intended to help ease the load on the content publisher. On the other hand, caches can include short-lived replicas, located near the edge of the network, and designed primarily to reduce network bandwidth by fulfilling local requests for the content.

In some embodiments, the CNR system implements a security model for authenticating and securing content, and content records. This makes it possible to implement a secure ICN, which allows for content to come from any source. For example, the CNR content record implements object-level security via an object security field, and provides record-level security via a record security field. Hence, a person or an organization can publish a named data object by creating a valid content record for the named data object, and publishing this content record to an authoritative CNR server. This valid content record can specify one or more sources for the named data object, and includes a valid object security field that secures the named data object, as well as a valid record security field that secures the content record.

Once the person or organization has uploaded the content record to the authoritative CNR server, it is possible for others to mirror the named data object. For example, other people or their server computers can insert additional IP addresses to the existing content record at the authoritative CNR server. These additional IP addresses can correspond to one or more servers that mirror the named data, such as at an FTP or HTTP server.

Mirroring

In CNR, any host wishing to mirror a piece of content may do so by registering itself as a mirror for the content through the CNR system. This registration process adds an address record for the new server without changing the base content record. This preserves the name of the content and associates the mirror with the content, making the content instantly accessible to applications resolving the name through the CNR system.

From a security standpoint, it is important to distinguish between entities that publish new content from entities that mirror existing content. A party that publishes a new data object needs to create a new base content record, and the authoritative CNR server must ensure that this party has the right to do so. For example, only Spencer should be allowed to publish base content records under the prefix "/parc/videos/spencer."

In contrast, this same restriction does not apply to parties wishing to mirror content. Often times, content mirrors arise out of immediate necessity, and sometimes the content publisher is either unaware, cannot be contacted during this time, or does not have the necessary resources to scale up at the moment. Thus, other entities may be allowed to append their address to an existing content record without the explicit permission of the publisher. A client device can use the object security field, which can include a hash or checksum of the content object, to verify that the content is accurate, regardless of the content's source. Since only the publisher may create or edit the content hash field, malicious or illegitimate hosts may successfully register themselves as mirrors and deliver malicious content. However, the client will easily be able to verify that this content is not legitimate using the object security field.

Content Delivery Networks (CDNs)

The CNR system can support other complex content replication schemes, such as content delivery networks (CDNs). A content publisher can employ a CDN to optimize content delivery over a given geographic region, or worldwide. The CNR system can provide integrated support for CDNs by taking advantage of the dynamic record generation. For example, in addition to local DNS servers generating addresses that correspond to local CDNs or HTP caches, the authoritative DNS server itself can localize responses by providing the address of a particular set of CDN servers, as opposed to the publisher's server.

Caching

CDNs and mirrors typically maintain long-lived replicas of the content, and are intended to reduce the load on the content publisher. In contrast, cached content may be short-lived or long-lived, and are intended primarily to reduce network traffic and latency by providing clients a recently-fetched copy of the content. The CNR system accomplishes caching by combining two previously independent systems: local DNS caches and local content caches.

CNR requests are first sent to a local CNR server, which may be associated with one or more caching servers. If a CNR server does have an associated caching server, the CNR server can check for a DNS cache-hit before resolving the name through the DNS. The local CNR server checks for a cache-hit for a name prefix, such that a cache-hit corresponds to a local HTTP proxy having a cached copy of the content itself. In this case, the local CNR server dynamically generates and returns a content record with the address of the content cache.

This implementation achieves a better understanding of client locality than typical CDNs, because the local CNR server knows the exact IP address of the client issuing the request. Typical CDNs are only able to localize content to the address of the local DNS server. Also, because the local CNR server is aware of the content cache, the CNR server can send the client directly to the cache itself. This is different from typical DNS requests that always return the address of the publisher, and HTTP proxies must be placed directly along this path to redirect a client to a cache server.

Figure 8:
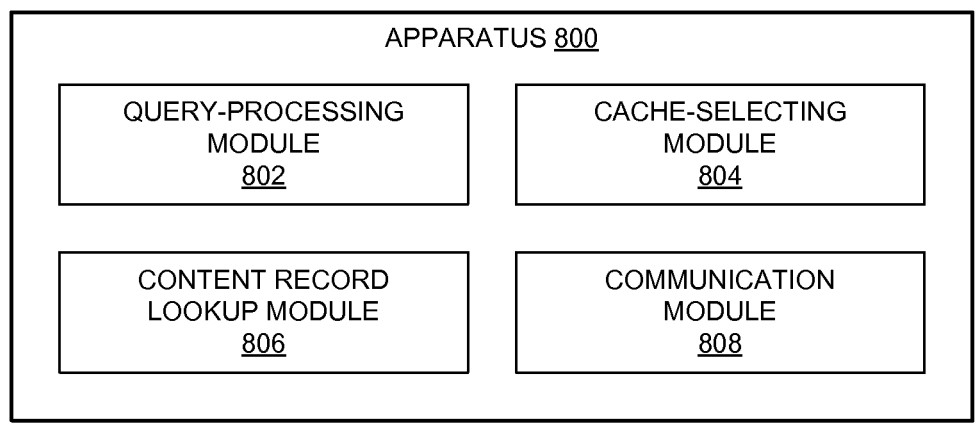
FIG. 8 illustrates an exemplary apparatus that facilitates retrieving a named data object based on a name prefix in accordance with an embodiment.

FIG. 8 illustrates an exemplary apparatus 800 that facilitates retrieving a named data object based on a name prefix in accordance with an embodiment. Apparatus 800 can comprise a plurality of modules which may communicate with one another via a wired or wireless communication channel or any other communication method now known or later developed. Apparatus 800 may be realized using one or more integrated circuits, and may include fewer or more modules than those shown in FIG. 8. Further, apparatus 800 may be integrated in a computer system, or realized as a separate device which is capable of communicating with other computer systems and/or devices. Specifically, apparatus 800 can comprise a query-processing module 802, a cache-selecting module 804, a content record lookup module 806, and a communication module 802.

In some embodiments, query-processing module 802 can process a query from a client device for a source to a named data object. Cache-selecting module 804 can identify a cache server that corresponds to the named data object's name prefix. Content record lookup module 806 can obtain a content record specifying one or more sources associated with the named data object's name prefix. Communication module 808 can receive a query from the client device, and can return the content record to the client device.

Figure 9:
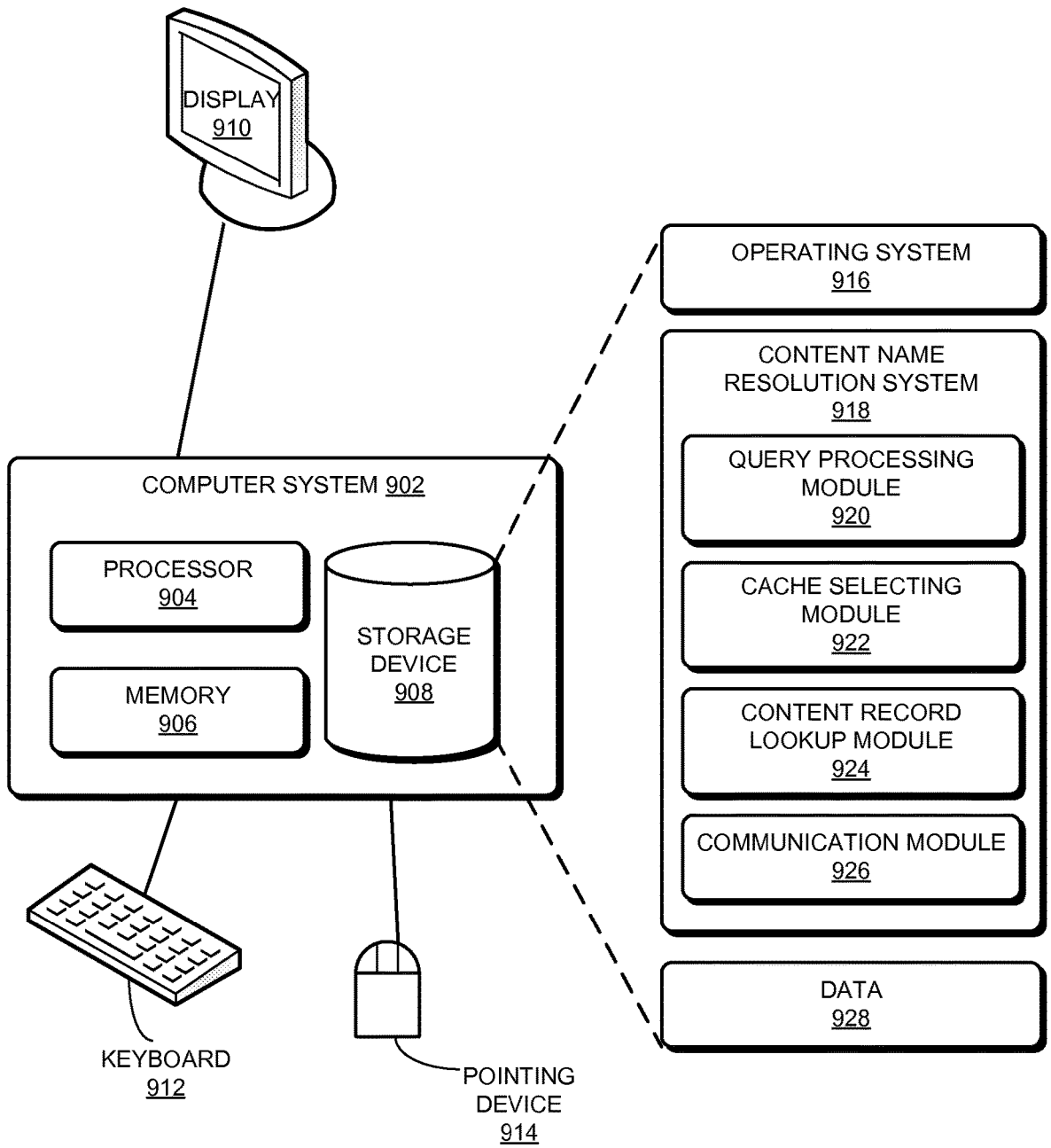
FIG. 9 illustrates an exemplary computer system that facilitates retrieving a named data object based on a name prefix in accordance with an embodiment.

FIG. 9 illustrates an exemplary computer system 902 that facilitates retrieving a named data object based on a name prefix in accordance with an embodiment. Computer system 902 includes a processor 904, a memory 906, and a storage device 908. Memory 906 can include a volatile memory (e.g., RAM) that serves as a managed memory, and can be used to store one or more memory pools. Furthermore, computer system 902 can be coupled to a display device 910, a keyboard 912, and a pointing device 914. Storage device 908 can store operating system 916, content name resolution (CNR) system 918, and data 928.

CNR system 918 can include instructions, which when executed by computer system 902, can cause computer system 902 to perform methods and/or processes described in this disclosure. Specifically, CNR system 918 may include instructions for processing a query from a client device for a source to a named data object (query-processing module 920). Further, CNR system 918 can include instructions for identifying a cache server that corresponds to the named data object's name prefix (cache-selecting module 922), and can include instructions for obtaining a content record specifying one or more sources associated with the named data object's name prefix (content record lookup module 924). CNR system 918 can also include instructions for receiving a query from the client device, and for returning the content record to the client device (communication module 926).

Data 928 can include any data that is required as input or that is generated as output by the methods and/or processes described in this disclosure. Specifically, data 928 can store at least content records for a set of named data objects, and a mapping table that associates name prefixes to one or more cache servers.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
receiving, by a content name resolution server in a computer network, a first request for a named data object, wherein the first request includes a first name for the named data object;
sending, by the content name resolution server, a content record to a client device, wherein the content record includes an indication of a content delivery protocol and a hostname length number associated with the content delivery protocol;
translating, by the client device, based on the hostname length number, the first name for the named data object into a second name for the named data object using the content delivery protocol, wherein portions of a string of the first name, beyond a length of the hostname length number, are placed in reverse order to obtain the second name;
sending a second request for the named data object to a cache server, wherein the second request includes the second name;
determining whether the cache server stores the named data object;
responsive to determining that the cache server does not store the named data object, sending a third request for the named data object to a source associated with the second name; and
responsive to receiving the named data object from the source, sending the named data object to the client device so as to resolve the first request for the named data object.

2. The method of claim 1, further comprising:
responsive to receiving the named data object from the specified source, storing the named data object.

3. The method of claim 1, wherein the content record includes the name for the named data object.

4. The method of claim 1, wherein the content record includes two or more sources associated with a name prefix for the named data object, wherein the content record further includes a list of addresses of the sources, wherein the addresses of the sources in the list are sorted based on a predetermined rule.

5. The method of claim 1, further comprising:
obtaining a name prefix from the request.

6. The method of claim 1, further comprising:
sending the named data object, responsive to determining that the cache server stores the named data object.

7. The method of claim 1, wherein the content record includes an address of the source.

8. An apparatus, comprising:
a processor; and
a memory,
wherein the processor is configured to:
send a first request in a computer network for a named data object, wherein the first request includes a first name for the named data object, and in response receive a content record, wherein the content record includes an indication of a content delivery protocol and a hostname length number associated with the content delivery protocol;
translate, based on the hostname length number, the first name for the named data object into a second name for the named data object using the content delivery protocol, wherein portions of a string of the first name, beyond a length of the hostname length number, are placed in reverse order to obtain the second name;
send a second request for the named data object to a cache server, wherein the second request includes the second name; and
receive the named data object from the cache server so as to resolve the first request for the named data object.

9. The apparatus of claim 8, wherein the content record includes the name for the named data object.

10. The apparatus of claim 8, wherein the content record includes two or more sources associated with a name prefix for the named data object, wherein the content record further includes a list of addresses of sources, wherein the addresses of the sources in the list are sorted based on a predetermined rule.

11. The apparatus of claim 8, wherein the processor is further configured to obtain a name prefix from the request.

12. The apparatus of claim 8, wherein the content record includes an address of a source for the named data object.

13. A non-transitory, computer-readable storage medium storing instructions that, when executed by a computer, cause the computer to perform a method comprising:
sending, by a client device in a computer network, a first request for a named data object, wherein the first request includes a first name for the named data object, and, in response receive a content record, wherein the content record includes an indication of a content delivery protocol and a hostname length number associated with the content delivery protocol;
translating, based on the hostname length number, the first name for the named data object into a second name for the named data object using the content delivery protocol, wherein portions of a string of the first name, beyond a length of the hostname length number, are placed in reverse order to obtain the second name;
send a second request for the named data object to a cache server, wherein the second request includes the second name; and
receiving the named data object from the source cache server so as to resolve the first request for the named data object.

14. The storage medium of claim 13, wherein the content record includes the name for the named data object.

15. The storage medium of claim 13, wherein the content record includes two or more sources associated with a name prefix for the named data object, wherein the content record further includes a list of addresses of sources for the named data object, wherein the addresses of the sources in the list are sorted based on a predetermined rule.

16. The storage medium of claim 13 the method further comprising: obtaining a name prefix from the request.

17. The storage medium of claim 13, wherein the content record includes an address of a source for the named data object.

* * * * *

UNITED STATES PATENT AND TRADEMARK OFFICE
CERTIFICATE OF CORRECTION

PATENT NO. : 10,706,029 B2
APPLICATION NO. : 15/620600
DATED : July 7, 2020
INVENTOR(S) : Spencer Sevilla et al.

It is certified that error appears in the above-identified patent and that said Letters Patent is hereby corrected as shown below:

In the Claims

Claim 13, Column 18, Line 51, please replace "from the source cache server" with --from the cache server--

Signed and Sealed this
Twenty-ninth Day of September, 2020

Andrei Iancu
*Director of the United States Patent and Trademark Office*